(12) United States Patent
Kamentser et al.

(10) Patent No.: US 6,201,555 B1
(45) Date of Patent: Mar. 13, 2001

(54) SHAFT ENCODER

(75) Inventors: Boris Kamentser, Fountain Valley; Eugenia Kamentser, Garden Grove, both of CA (US)

(73) Assignee: Bokam Engineering, Santa Ana, CA (US)

( * ) Notice: Subject to any disclaimer, the term of this patent is extended or adjusted under 35 U.S.C. 154(b) by 0 days.

(21) Appl. No.: 09/188,192

(22) Filed: Nov. 9, 1998

(51) Int. Cl.$^7$ ............................................. B41J 2/41
(52) U.S. Cl. ................................. 347/112; 347/152
(58) Field of Search ........................... 347/112, 152

(56) References Cited

U.S. PATENT DOCUMENTS 4,962,393 * 10/1990 Fulton et al. .................... 347/152

* cited by examiner

Primary Examiner—Trong Phan
(74) Attorney, Agent, or Firm—Leonard Tachner

(57) ABSTRACT

A shaft encoder providing a pulsed output signal with rotation of a shaft, the number of pulses being dependent upon a shaft-mounted gear and its number of teeth. In a preferred embodiment, a piezo film element is mounted in intimate contact with a spring element, the latter being positioned to engage the teeth of the gear. When the shaft rotates, the gear rotates as well. The gear teeth cause the spring element to be displaced and then return to a nominal position for each tooth. Accordingly, given a sufficient number of regularly spaced teeth around the gear, a relatively high resolution pulsed signal is generated as the shaft rotates. The piezo film element generates electrical pulses due to the mechanical displacement of the spring element to which the film is in contact. Thus, no electrical power source is required to generate the pulses. Moreover, because of the simplicity of the invention, size scaling is readily available. Thus, the shaft encoder of the invention may be readily fabricated in extremely small configurations depending upon the desired application and the availability of machining or other techniques for producing small, accurately placed teeth. Furthermore, in an alternative embodiment, one tooth of the gear may be made slightly different from the others (i.e., higher) to provide a different pulse characteristic (i.e., greater amplitude) to indicate a reference position for the shaft. Moreover, the polarity of the generated pulse will indicate the direction of shaft rotation; i.e., positive for clockwise and negative for counterclockwise.

14 Claims, 3 Drawing Sheets

SHAFT ENCODER

BACKGROUND OF THE INVENTION

1. Field of the Invention

The present invention relates generally to the field of shaft encoders and more specifically to an improved shaft encoder which provides a pulsed output signal upon rotation of a shaft, the improvement relating to the low cost, reliability and simplicity of the encoder of the invention.

2. Prior Art

Shaft encoders provide electrical signals indicative of a shaft's angular position, speed of rotation and direction. Modern shaft encoders typically provide an output in the form of a series of electrical pulses the rate of which is proportional to the rotational rate of the shaft. The angular resolution of the shaft encoder is dependent upon the number of pulses generated per revolution of the shaft. The larger the number of pulses per revolution, the more complex and sophisticated is the encoder and therefore the more costly. Moreover, the complexity of the encoder leads to a reduction in reliability because there are more components that could become faulty or inoperative. However, there are applications for shaft encoders where less precise resolution is needed such as within 5 or 10 degrees as opposed to tenths of a degree. Unfortunately there are no prior art shaft encoders which fully exploit a reduction in resolution requirements. As a result, even low resolution shaft encoders are relatively expensive and unreliable and are still sufficiently complex to make size reduction a still formidable challenge.

There is therefore an ongoing need for a low cost, highly reliable shaft encoder capable of modest angular resolution and which can be made in relatively small package sizes.

SUMMARY OF THE INVENTION

The present invention comprises a shaft encoder providing a pulsed output signal with rotation of a shaft, the number of pulses being dependent upon a shaft-mounted gear and its number of teeth. In a preferred embodiment, a piezo film element is mounted in intimate contact with a spring element, the latter being positioned to engage the teeth of the gear. When the shaft rotates, the gear rotates as well. The gear teeth cause the spring element to be displaced and then return to a nominal position for each tooth. Accordingly, given a sufficient number of regularly spaced teeth around the gear, a relatively high resolution pulsed signal is generated as the shaft rotates. In the illustrated embodiment, there are 60 teeth on the gear. Thus, the pulses occur at 6 degree intervals as the shaft rotates. The piezo film element generates electrical pulses due to the mechanical displacement of the spring element to which the film is in contact. Thus, no electrical power source is required to generate the pulses. Moreover, because of the simplicity of the invention, size scaling is readily available. Thus, the shaft encoder of the invention may be readily fabricated in extremely small configurations depending upon the desired application and the availability of machining or other techniques for producing small, accurately placed teeth. Furthermore, in an alternative embodiment, one tooth of the gear may be made slightly different from the others (i.e., higher) to provide a different pulse characteristic (i.e, greater amplitude) to indicate a reference position for the shaft. Moreover, the polarity of the generated pulse will indicate the direction of shaft rotation; i.e., positive for clockwise and negative for counterclockwise. The resulting shaft encoder is inexpensive, reliable and provides good angular resolution for its cost.

OBJECTS OF THE INVENTION

It is therefore a principal object of the present invention to provide a shaft encoder wherein a series of electrical pulses are generated in response to rotation of a shaft.

It is another object of the invention to provide a mechanical rotation sensor that by generating electrical pulses, indicates the position, speed and even direction of a shaft.

It is yet another object of the invention to provide a shaft encoder which needs no source of electrical power to generate electrical pulses in response to rotation of a shaft.

It is still another object of the invention to provide a shaft encoder which may be made smaller and more reliable than conventional shaft encoders while still providing acceptable angular resolution.

It is still another object of the present invention to provide a shaft encoder wherein a gear having a plurality of regularly spaced teeth engages a spring member to which a piezo film element is in contact whereby rotation of the shaft causes periodic displacement and recovery of the spring member and the attached film element.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
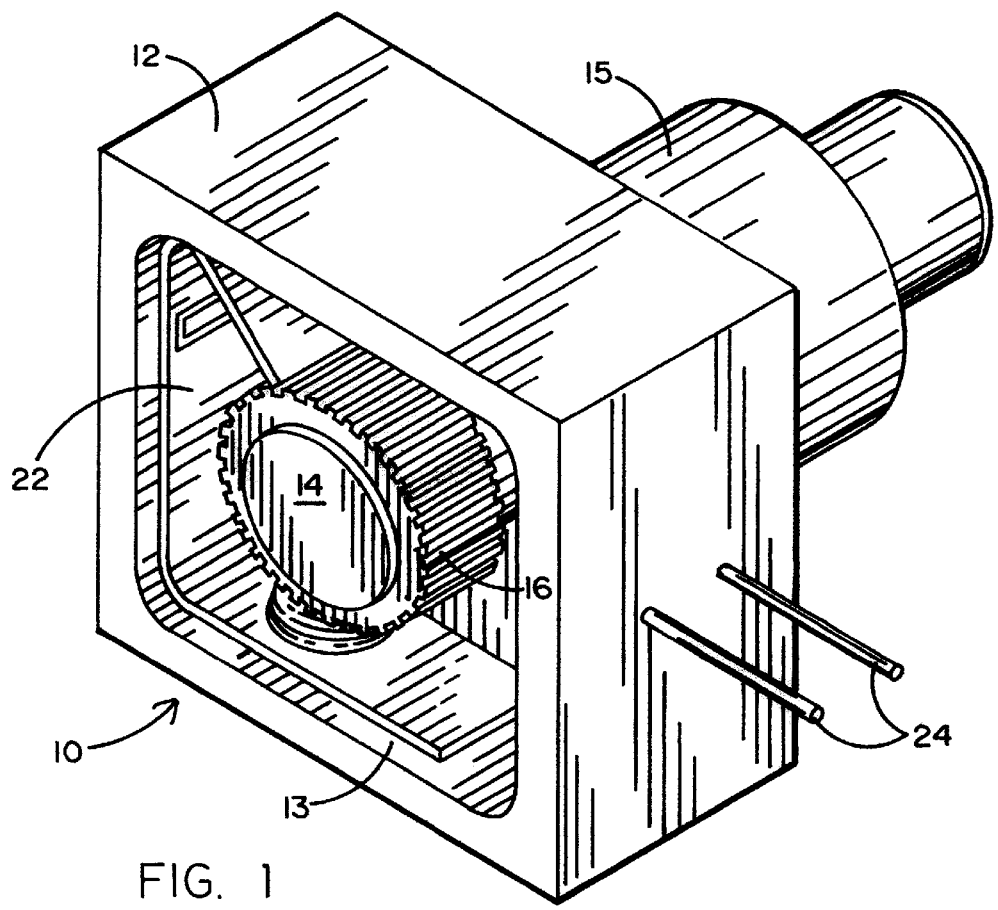
FIG. 1 is a three-dimensional drawing of a preferred embodiment of the inventive shaft encoder with an enclosing surface removed to reveal the interior thereof.
Figure 2:
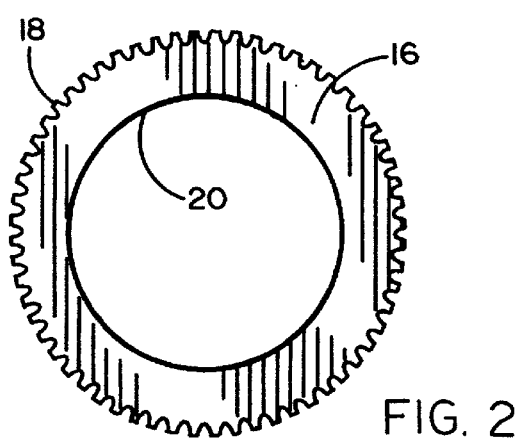
FIG. 2 is an elevational view of a gear used in the preferred embodiment.
Figure 3:
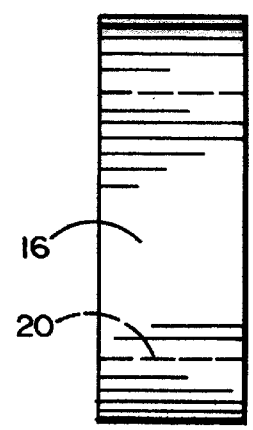
FIG. 3 is a side view of the gear of FIG. 2.

Referring to the accompanying figures, it will be seen that a shaft encoder 10 in accordance with a preferred embodiment comprises a generally rectangular hollow housing 12 in which there extends a rotatable shaft 14 supported by a sealed bearing 15. A cover (not shown) is removed from the housing 12 to reveal the components within the housing internal chamber 13. A gear 16 is mounted to the end of the shaft 14. The gear 16 has a plurality of regularly spaced gear teeth 18. The gear has an inner annular surface 20 which is smooth and sized to permit gear 16 to be tightly press fit onto shaft 14.

Figure 4:
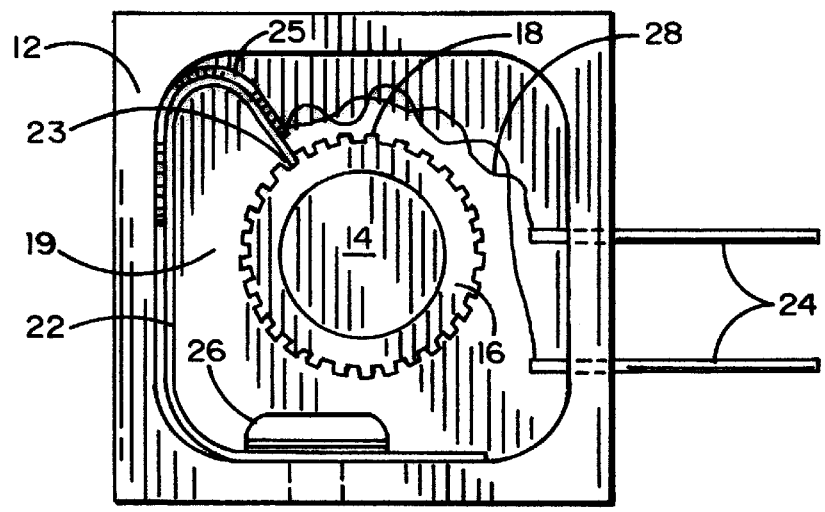
FIG. 4 is an elevational view of the shaft encoder of FIG. 1.
Figure 5:
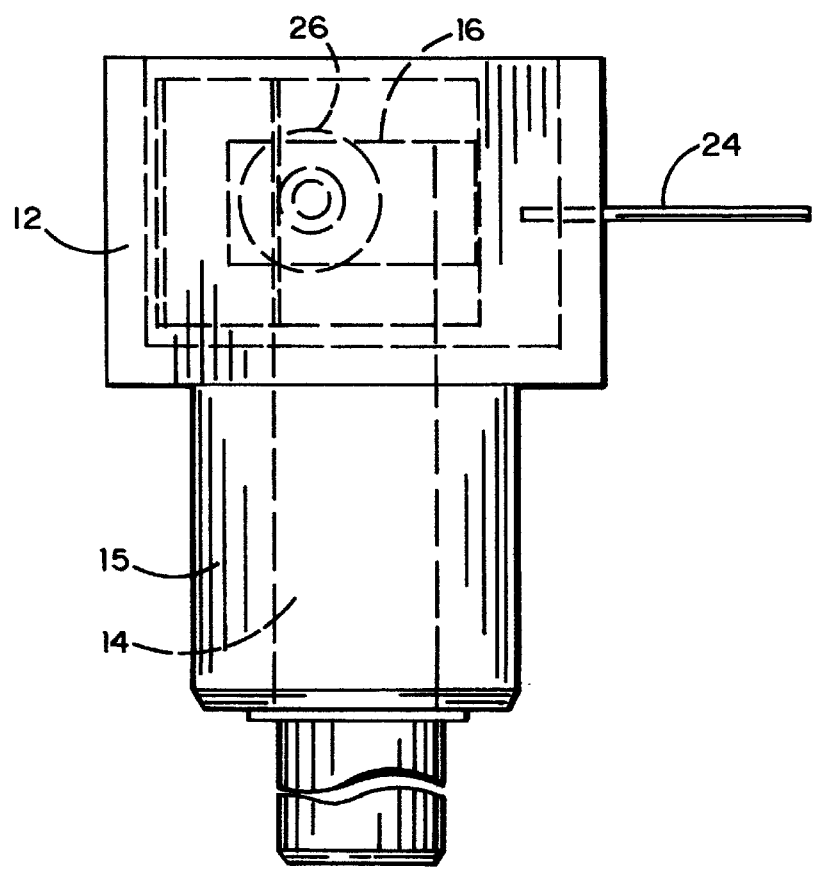
FIG. 5 is a top view of the shaft encoder.
Figure 6:
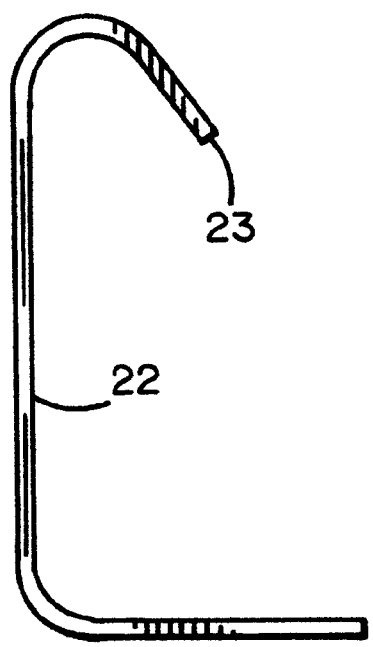
FIG. 6 is a side view of the spring used in the preferred embodiment.
Figure 7:
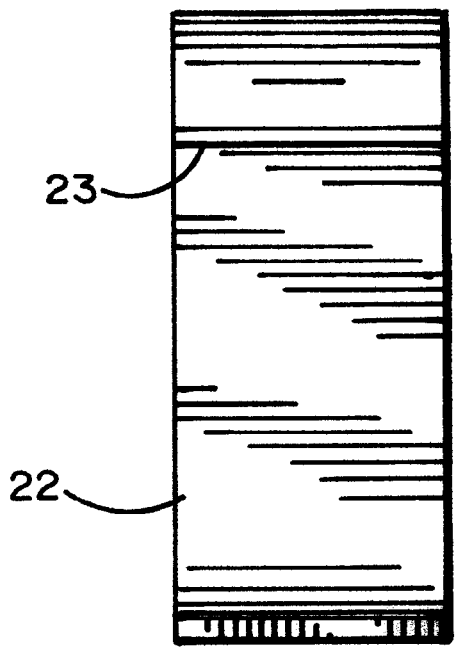
FIGS. 7 and 8 are side and top views, respectively, of the spring.
Figure 8:
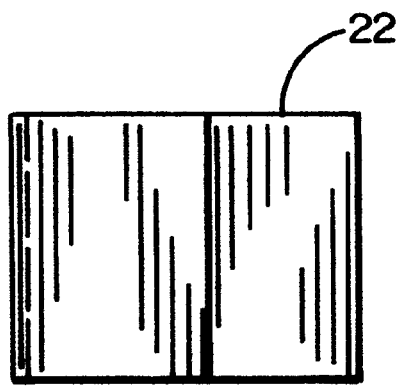

A spring 22 is secured to the inner wall of chamber 13 by a retaining bolt 26. Spring 22 is shown best in FIGS. 6–8. It comprises a unitary elongated thin metal rectangle bent into an L-shape with an upper portion bent approximately 135 degrees and terminating in a tip 23. As shown best in FIGS. 1 and 4, the spring 22 is positioned so that tip 23 engages the teeth 18.

A piezo film element 25 is adhesively affixed to a portion of spring 22. Piezo film element 25 may for example be an Amp Incorporated model LDT-0 laminated piezo film strip which generates a significant voltage in response to an applied force. The piezo film element 25 is connected by a pair of wire leads 28 to a pair of electrodes 24. Each time that the film element is flexed by the interaction of the tip 23 and rotating gear teeth 18, film 25 generates an electrical pulse at electrodes 24. The number of pulses per revolution of the shaft 14 depends upon the number of teeth 18 on gear 16. In the embodiment illustrated, there are about 60 teeth thus providing 60 pulses per revolution. However, it will be understood that the actual number of teeth is not limiting of the invention and, in fact, is only limited by the available methods for fabricating gear 16.

Having thus disclosed an illustrative embodiment of the invention, it being understood that the disclosure is not to be deemed limiting of the scope hereof, what is claimed is:

What is claimed is:

1. A shaft encoder for generating a series of electrical pulses in response to rotation of a shaft; the shaft encoder comprising:
   a gear affixed to said shaft for rotation therewith, said gear having a plurality of teeth;
   a spring having a tip and being positioned relative to said gear for engaging said tip with said teeth for repeatedly flexing said spring upon rotation of said shaft; and
   a piezo film element having a pair of electrical leads and being in intimate physical contact with said spring for generating an electrical pulse at said leads each time said spring is fixed by said gear teeth.

2. The shaft encoder recited in claim 1 further comprising a housing in which said shaft terminates, said housing being hollow and forming a chamber enclosing said spring and said piezo film element therein.

3. The shaft encoder recited in claim 2 wherein said spring is attached to said housing at a location spaced from said tip.

4. The shaft encoder recited in claim 2 further comprising a pair of electrodes extending from said housing and a pair of wires connecting said electrodes to said leads of said piezo film element.

5. The shaft encoder recited in claim 2 further comprising a bearing extending from said housing and surrounding said shaft for rotational support thereof.

6. The shaft encoder recited in claim 1 wherein at least some of said teeth are regularly spaced from each other.

7. A shaft encoder for generating electrical pulses in response to rotation of a shaft; the shaft encoder comprising:
   a plurality of teeth positioned around said shaft and extending radially therefrom;
   a spring engaging said teeth for being repeatedly flexed and relaxed as said shaft rotates; and
   a piezoelectric device in intimate physical contact with said spring, said device generating an electrical pulse each time it is flexed and relaxed by said teeth on said rotating shaft.

8. The shaft encoder recited in claim 7 further comprising a housing in which said shaft terminates, said housing being hollow and forming a chamber having said teeth, said spring and said piezoelectric device.

9. The shaft encoder recited in claim 8 wherein said spring is attached to said housing at a location spaced from said teeth.

10. The shaft encoder recited in claim 8 further comprising a pair of electrodes extending from said housing and a pair of wires connecting said electrodes to said piezoelectric device.

11. The shaft encoder recited in claim 8 further comprising a bearing extending from said housing and surrounding said shaft for rotational support thereof.

12. The shaft encoder recited in claim 7 wherein at least some of said teeth are regularly spaced from one another.

13. A shaft encoder comprising a piezoelectric element configured with respect to a rotating shaft for generating electrical pulses in response to said shaft rotation without requiring a separate source of electrical power.

14. The shaft encoder recited in claim 13 wherein said electrical pulses are of opposite polarity depending on the direction of shaft rotation.

\* \* \* \* \*